March 1, 1960
J. C. FORD
2,926,557
DOUGH CUTTING AND SHAPING MECHANISM
Filed July 8, 1957
2 Sheets-Sheet 1
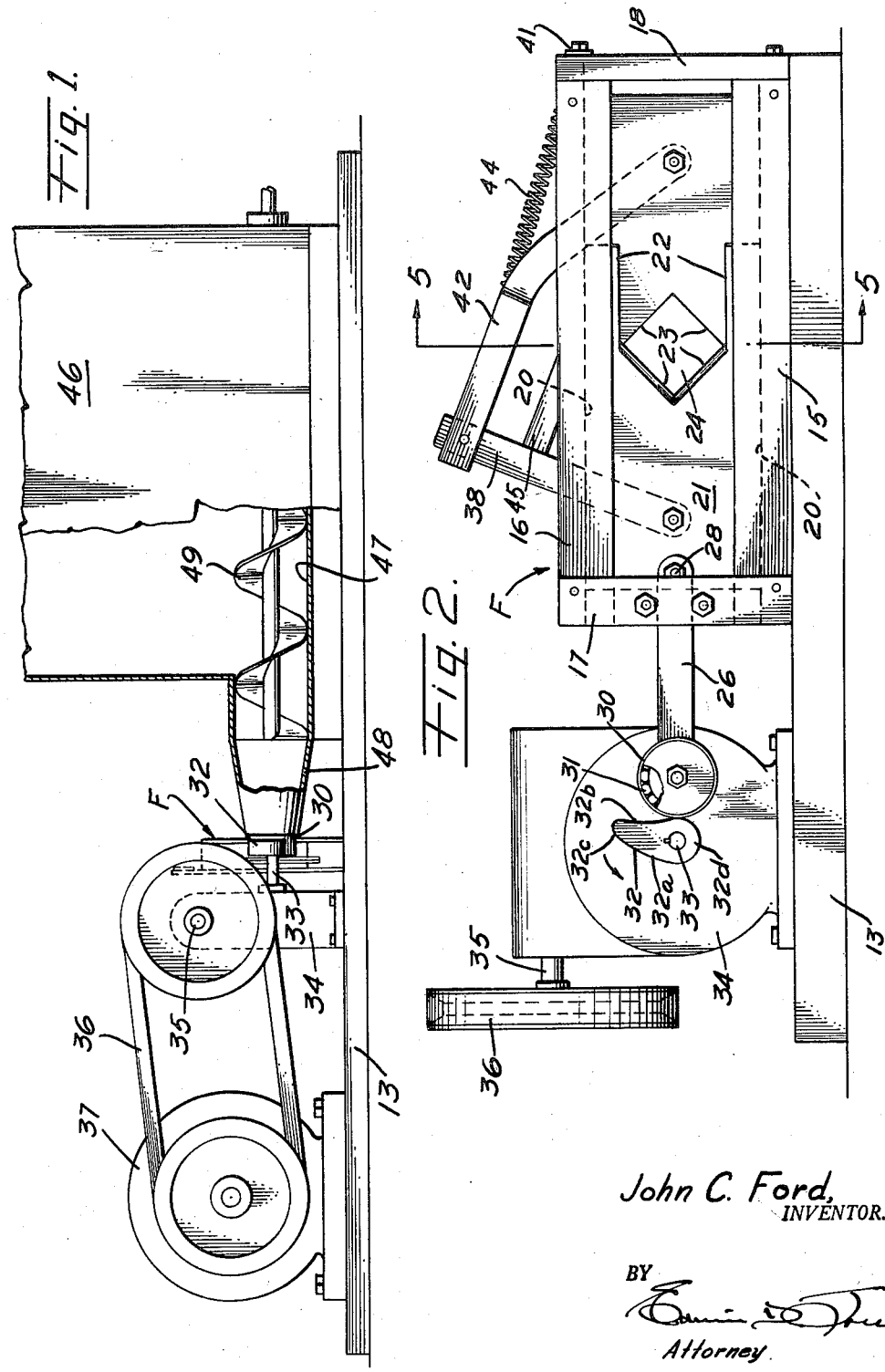
John C. Ford,
INVENTOR.
BY
Attorney.

March 1, 1960 J. C. FORD 2,926,557
DOUGH CUTTING AND SHAPING MECHANISM
Filed July 8, 1957 2 Sheets-Sheet 2
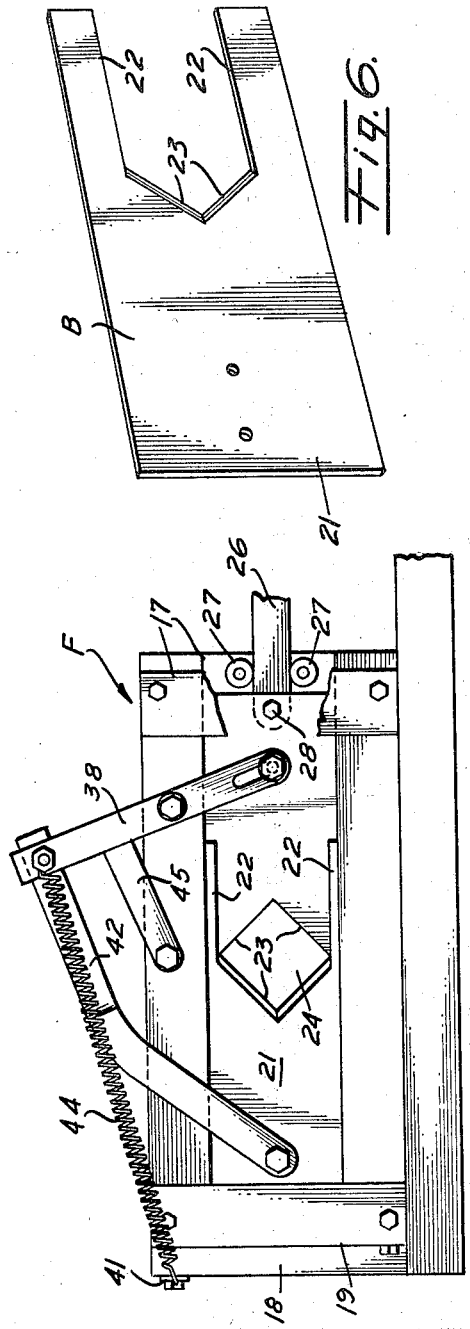
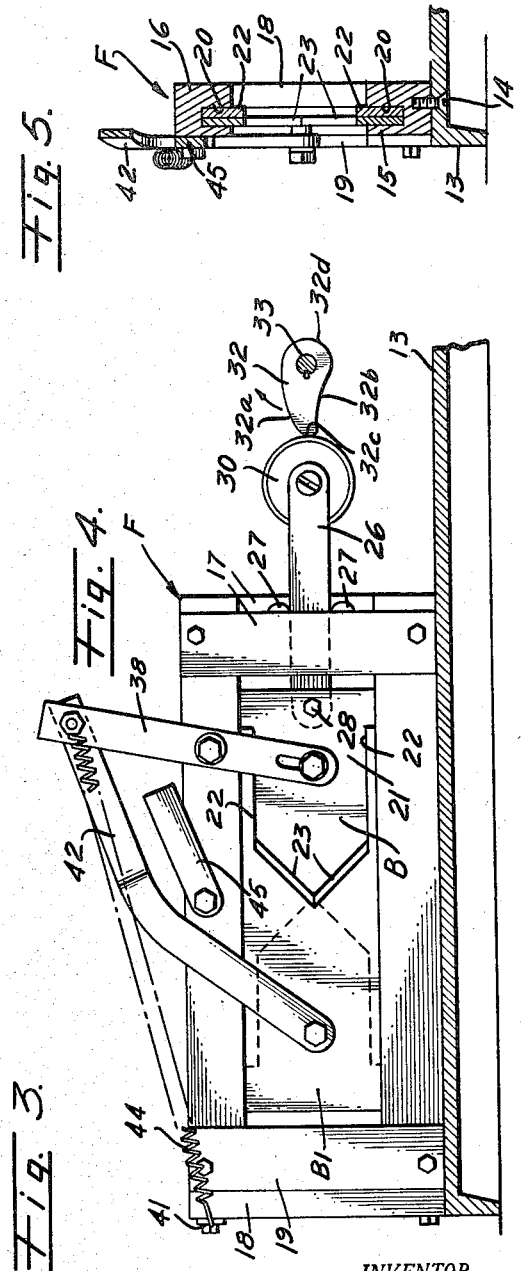
INVENTOR,
John C. Ford.
BY
Attorney

2,926,557
DOUGH CUTTING AND SHAPING MECHANISM

John C. Ford, Monterey Park, Calif.

Application July 8, 1957, Serial No. 670,471

4 Claims. (Cl. 83—623)

My invention relates to dough cutting and shaping mechanisms, and it has for a purpose the provision of a mechanism by which dough as extruded from the nozzle of a hopper can be cut into pieces of spherical form, that is balls, and by so doing greatly facilitating the making of various bakery products, such as biscuits, buns and, more particularly, tortillas.

It is also a purpose of my invention to provide a mechanism for cutting and shaping dough into balls, which includes a pair of blades each having two coplanar cutting edges at angles to each other, a frame for supporting the blades for movement in planes paralleling each other and with the cutting edges thereof confronting each other, and a means for so reciprocating the blades that they are intermittently opened to allow dough as extruded from a nozzle to be fed between the cutting edges thereof, and then intermittently closed to cause the cutting edges to coact in producing a constricting shearing cut of the dough resulting in its being shaped into balls.

I will describe only one form of dough cutting and shaping mechanism embodying my invention, and will then point out the novel features thereof in claims.

In the accompanying drawings:

Fig. 1 is a view showing in end elevation one form of dough cutting and shaping mechanism embodying my invention as applied to a conventional dough feeder, and wherein the latter is shown partly in section.

Fig. 2 is an enlarged view showing the mechanism in side elevation and wherein the blades are in open position.

Fig. 3 is view similar to Fig. 2, but showing the opposite side of the mechanism, and with the driving means for the connecting rod omitted.

Fig. 4 is a view similar to Fig. 3 but with the blades in closed position.

Fig. 5 is a vertical sectional view taken on the line 5—5 of Fig. 2.

Fig. 6 is a detail perspective view of one of the blades.

Referring more particularly to the drawings, my invention in its present embodiment comprises a base plate 13 upon which is secured, by fastening members 14, a rectangular frame generally designated at F, and which comprises a lower bar 15, an upper bar 16 secured in spaced parallelism to the lower bar at one end by two vertical plates 17 and, at the other end by a vertical bar 18 in abutting relation to the corresponding ends of the bars 15 and 16, and a vertical plate 19 secured to one side of the bars adjacent the bar 18.

The confronting sides of the bars 15 and 16 are formed with grooves or channels 20 which are coextensive in length with such bars, U-formed in cross section, and disposed to one side of the major axes of the bars. These grooves 20 are of such width as to slidingly receive a pair of blades, designated generally at B and B1, so that they may be moved longitudinally in the grooves in one direction or the other.

The blades B and B1 are substantially of identical construction and, therefore, a description of one will suffice for both. Each blade is made from a flat rectangular sheet of steel which is formed to provide a flat shank 21 at one end of which are a pair of parallel spaced guide arms 22. At the proximal ends of the arms 22 the blade is shaped to form a pair of linear cutting edges 23 disposed at angles to each other.

In the present instance, these cutting edges 23 are disposed at right angles to each other, but it will be understood that they may be disposed at other angles and, in fact, may be of curved form. As will be observed from Figs. 2 and 3, the cutting edges of both blades are bevelled to make them sharp, but the edges of one blade are bevelled oppositely from those of the other blade so that the sharp edges of one blade are in confronting relation to those of the other blade.

The blades B and B1 as mounted in the grooves 20 are arranged in side-by-side relation and with the guide arms 22 extending in opposite directions at the confronting ends of the blades. Similarly, the cutting edges 23 are disposed in confronting relation to each other to form an opening 24 therebetween when the blades are in partly or fully open position.

The blades B and B1 are adapted to be reciprocated in the frame F intermittently and in opposite directions, first to constrict and ultimately close the opening 24 and then progressively enlarge the opening to its maximum area.

Any suitable mechanism may be provided for this purpose, and, in the present instance, such mechanism comprises a flat connecting rod 26, supported for rectilinear movement in the frame F between the plates 17 by a pair of rollers 27. One end of this rod is rigidly connected with blade B along its center line as at 28. The other end of the rod has fixed thereto a stub axle on which a roller or wheel 30 is rotatably mounted by means of suitable bearings 31.

A cam 32 having a convex side 32a, a concave side 32b, and rounded ends 32c and 32d, is fixed on a driven shaft 33. This shaft projects from one side of a box 34 fixed on the base plate 13 and containing a reduction gearing of conventional form and to which the shaft is connected. Projecting from the top of the box 34 at right angles to the driven shaft 33 and operatively connected to the reduction gearing, is a driving shaft 35, which, in the present instance, is driven by a pulley and belt connection 36 with an electric motor 37 secured on the base plate 13.

Those parts of the mechanism above described are operable to move the blade B from the outermost position shown in Fig. 2 to the innermost position shown in Fig. 4. This is effected by rotation of the cam 32 in a counter-clockwise direction as when viewed in Fig. 2, to cause the convex side 32a as it rides on the roller 30 to move the rod longitudinally to the right, thus moving the blade B from its outermost to its innermost position.

The lever 38 and the link 42 provide an operative connection between the blades B and B1 such that when the rod 26 is moved by the cam 32 the resultant inward movement of the blade B rotates the lever in a clockwise direction as viewed in Fig. 3, thereby pulling the link 42 toward the lever and thus causing the blade B1 to move from its outermost to its innermost position. Thus through movement of the rod 26 in one direction both blades are moved from the open position shown in Fig. 3 to the closed position shown in Fig. 4 wherein the opeing 24 is closed.

While the cam 32 is operable to move the blades B and B1 in the manner above described, it is not operable to move the blades outwardly in opposite directions from each other to the open position shown in Fig. 4. For this purpose a coiled contractile spring 44 is connected at one end to the connection 41, and at the other end to lever 38 so as to urge the lever 38 in a clockwise direction as when viewed in Fig. 2 and to the position shown in Fig. 2 as limited by a stop member 45 fixed to the upper bar 16.

It will be clear that under movement of the blade B by the rod 26 from its outermost to its innermost position, the lever 38 being swung in a counterclockwise direction increases the tension of the spring 44 to a degree such that as the roller 30 passes off of the cam end 32d onto the concave cam side 32b, the spring acts through the lever to force the blade B to its outermost position and the blade B1 to a corresponding position through the resultant movement of the link 42. In so doing the rod 26 is forced outwardly to maintain the roller 30 in contact with the cam side 32b so that with continued rotation of the cam counterclockwise the convex side 32a will function to move the rod inwardly for closing the blades.

It is important to note that the cam 32 is so shaped that it operates to move the blades to closed position at a slower rate of speed, than does the spring 44 to move the blades to open position. The reasons for this will be described later herein.

To utilize the blades for cutting and shaping dough into pieces of ball form incident to making of bakery products of various shapes, my invention is shown in Fig. 1 applied to a conventional means for continuously supplying dough to and through the opening 24 as formed when the blades are in open position.

This dough supply means comprises a hopper 46 having at its bottom a trough 47 leading at one end to a nozzle 48. In the trough 47 is a screw conveyor 49 which, when rotated, feeds dough from the trough into the large end and out of the small end of the nozzle 48. The nozzle being of frusto-conical form causes the dough as extruded therefrom to be in the form of a continuous strip rounded in cross section.

With my invention associated with the dough supply means the blades are arranged transversely of the outlet end of the nozzle 48 and so that the opening 24 when formed by moving the blades to open position, will register with such outlet end.

To cut and shape the strip of dough into pieces of ball form as extruded from the nozzle 48, the blades operate as follows:

When the blades are in open position the opening 24 is of sufficient size to locate the cutting edges 23 in tangential relation to the round extruded dough strip. Under movement of the blades from open to closed position, during which the dough continues to be extruded from the opening, the two pairs of cutting edges 23 penetrate the dough strip at four different tangents relative thereto, and once the meeting or outer ends of the cutting edges pass each other at the center of the strip, the strip is severed from the remainder of the dough. Because the cutting edges 23 penetrate the dough strip at tangents relative thereto, the dough is reshaped by the blades into spherical form prior to severance, and thus as severed the dough has the general form of a ball.

Following one such dough cutting and shaping operation, the blades rapidly move to open position and then slowly move further apart to again form the opening 24 thus permitting a succeeding length of dough to pass through the opening for a succeeding cut by the blades into another piece of ball form. Due to the fact that the blades rapidly open prevents an accumulation of dough between the nozzle and the blades such as to prevent the blades from cutting the dough into ball form. Thus, it will be understood that with continuous opening and closing of the blades concurrently with continuous feeding of dough to the blades, the blades are operable to continuously cut and shape the dough into balls.

Manifestly, the size of the dough balls can be varied in accordance with variation in speed of dough feed in relation to speed of blade reciprocation or vice versa. Also, the size of the balls can be varied by changing the size of the nozzle to extrude round strips of different diameters.

By cutting and shaping the dough into balls the succeeding operations necessary for making any bakery product which in ultimate form is round, such as biscuits, can be reduced in number thus decreasing the cost of making the product. My invention is particularly designed for making tortillas, which are both flat and round, and where the dough is initially cut into ball form, the rolling operations necessary to flatten and shape the dough into a perfect circle of the proper diameter, are reduced in number together with the machine parts required.

Although I have herein shown and described only one form of dough cutting and shaping mechanism embodying my invention, it is to be understood that various changes and modifications may be made therein without departing from the spirit of the invention and the spirit and scope of the appended claims.

What I claim is:

1. A dough cutting and shaping mechanism, including: a pair of blades each having two coplanar cutting edges at angles to each other; means supporting said blades for movement in planes paralleling each other and with the cutting edges thereof confronting each other; and mechanism for so reciprocating said blades that they move first simultaneously toward, and then simultaneously away from each other, said mechanism including a member connected to the outer end of one of said blades; power-driven means for moving the member intermittently in one direction to intermittently move that blade connected thereto toward the other blade; elements so operably connecting the two blades that the motion of that blade moved by the member is transmitted to the other blade to cause the latter to simultaneously move toward the other blade; and means so urging said elements as to cause both blades to move outwardly away from each other following each movement inwardly toward each other by the member and said elements.

2. A dough cutting mechanism as embodied in claim 1, wherein said elements comprise a lever fulcrumed on said supporting means and pivoted to that blade to which the member is connected, a link pivoted to the other of said blades and to the lever at the opposite side of its fulcrum from its pivotal connection to said last mentioned blade; and said urging means comprises a contractile spring connected at one end to said supporting means and at the other end to the pivotal connection of the link with the lever.

3. A dough cutting and shaping mechanism, including: a pair of blades each having two coplanar cutting edges at angles to each other; means supporting said blades for movement in planes paralleling each other and with the cutting edges thereof confronting each other; a member connected to the outer end of one blade and supported for rectilinear movement in said supporting means; a lever fulcrumed on said supporting means and pivoted to the last mentioned blade; a link pivoted to the other of said blades and to the lever at the opposite side of its fulcrum from its pivotal connection to said last mentioned blade; a contractile spring connected to said supporting means and to the lever for urging the lever and link to move the blades in opposite directions outwardly from each other, and the member in a direction corresponding to the direction of movement of the blade to which it is connected; and a cam rotatable for moving the member in the opposite direction whereby, the blade connected to the member is moved inwardly toward the other blade, and the link and lever actuated against the urging action of said spring to move the other blade inwardly toward the confronting blade so as to cause the cutting edges of both blades to coact in cutting any doughy material extended therebetween into balls.

4. A dough cutting and shaping mechanism, including: a pair of blades each having two coplanar cutting edges at angles to each other; means supporting said blades for movement in planes paralleling each other and with the cutting edges thereof confronting each other; and mechanism for so reciprocating said blades that they move first simultaneously toward, and then simultaneously away from each other, the mechanism including a power driven reciprocating member connected to the outer end of one of said blades; a lever fulcrumed on said supporting means and pivoted to the last mentioned blade; a link pivoted to the other of said blades and to the lever at the opposite side of its fulcrum from its pivotal connection to said last mentioned blade; and a contractile spring connected at one end to said supporting means and at the other end to the pivotal connection of the link with the lever.

References Cited in the file of this patent

UNITED STATES PATENTS

| | | |
|---|---|---|
| 669,905 | Sterne | Mar. 12, 1901 |
| 738,242 | Romero et al. | Sept. 8, 1903 |
| 1,519,423 | Theimer | Dec. 16, 1924 |
| 1,798,106 | Pels | Mar. 24, 1931 |
| 2,793,598 | Rivoche | May 28, 1957 |